United States Patent Office 3,063,966
Patented Nov. 13, 1962

3,063,966
PROCESS OF MAKING WHOLLY AROMATIC POLYAMIDES
Stephanie Louise Kwolek, Wilmington, Del., Paul Winthrop Morgan, West Chester, Pa., and Wayne Richard Sorenson, Wilmington, Del., assignors to E. I. du Pont de Nemours and Company, Wilmington, Del., a corporation of Delaware
No Drawing. Filed Feb. 5, 1958, Ser. No. 713,304
8 Claims. (Cl. 260—78)

This invention is concerned with a chemical process for preparing polymers and more particularly with a low temperature process for preparing high molecular weight polyamides.

Among the most important synthetic polymers are polyamides. These polymers offer a wide range of desirable physical and chemical properties. Because of their high degree of usefulness, many different methods for preparing polyamides have been studied and several methods have been developed in some detail. Commercially, most polyamides are prepared by melt polymerization techniques involving high temperatures up to 300° C. This process is useful but suffers from certain handicaps. High molecular weight wholly aromatic polyamides having water-white color cannot be prepared by melt polymerization techniques because the high temperatures required for melt polymerizations foster reactant condensations other than the desired amide formation so that only highly colored low molecular weight or cross-linked products are obtained.

Low temperature reactions below 100° C. and preferably below 50° C. are desirable for economy and to reduced by-product formation and promote linear polyamide formation. However, when high temperatures are not employed, the reactants, themselves must be very reactive in the absence of added heat and use of very reactive materials again produces the problem of side reactions and by-product formation. For example, diamines and acid halides are the fastest reacting intermediates in the preparation of polyamides but are likewise the most susceptible to hydrolysis and to interaction with a solvent medium. In addition, mobility of both the growing polymer and the reactants is reduced as high polymer forms which serves to limit the molecular weight which can be obtained. This is particularly true if polymerization is attempted without any solvent. Even when solvents are used, by-product formation usually interferes with the formation of high molecular weight products.

The process of U.S. 2,708,617 provides one solution to the general problem of low-temperature polyamidation. In this process, acid halide solution encounters the coreactive phase at the moment when polymer is formed at an interface of controlled shape and then the contact is only momentary because the polymer is immediately withdrawn. Thus, opportunities for side-reactions are minimized. The system works well with aliphatic intermediates which give polymers sufficiently swollen by the solvents employed to permit rapid formation of high molecular weight polymer, but is unsuitable for producing high molecular weight polyamides from aromatic diamines and aromatic diacid chlorides.

It would be desirable to utilize a low-temperature polyamidation reaction in which other reactions do not impede the formation of a high molecular weight product. Such a process would be particularly desirable for the preparation of polyamides from aromatic intermediates. Aromatic diamines react more slowly with aromatic diacid chlorides and, therefore, the side-reaction problem is accentuated. Moreover, aromatic polyamides are less soluble and less mobile during polymerization and low temperature polymerizations cannot always be prolonged until high molecular weight polymers are obtained.

It is an object of this invention to provide a process for preparing wholly aromatic polyamides having properties not heretofore realized.

It is a still further object to provide solutions of wholly aromatic polyamides suitable for further processing into fibers, films and similar shaped structures.

It is another object to prepare high molecular weight wholly aromatic water-white film- and fiber-forming polyamides in a solution process at room temperatures.

In accordance with the process of this invention, an aromatic diamine is reacted with an aromatic diacid halide in solution in a selected liquid medium to produce a high molecular weight film- and fiber-forming wholly aromatic polyamide characterized by the recurring structural unit

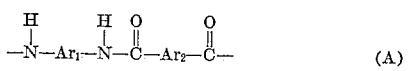

wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, sulfonyl, nitro, lower carbalkoxy, or other groups which do not condense with the reactants during polymerization.

In a preferred embodiment of this invention, the reaction of aromatic diamine and aromatic diacid halide is carried out in a liquid medium comprising a halogenated non-aromatic hydrocrabon which contains at least one hydrogen on a carbon attached to the halogen, or a cyclic methylene sulfone, and an organic tertiary amine as acid acceptor.

In another preferred embodiment, the liquid reaction medium is an amide-type organic compound of the formula:

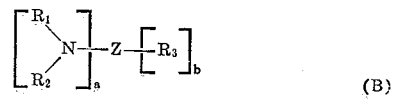

where $R_1$, $R_2$, and $R_3$ may be the same or different and are lower alkyl or alkylene radicals so chosen that the total number of carbon atoms in all of $R_1$, $R_2$, and $R_3$ is not more than 6 "$a$" is 1 or 2, "$b$" is 0 or 1, Z is an acidic radical such as

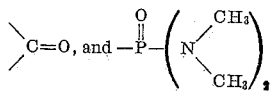

(where P is phosphorus) and the sum of $a+b$ is such as to satisfy the above-indicated valences of the radical Z, While $R_1$, $R_2$, and $R_3$ as indicated can be separate alkyl groups, any two of these groups can be present in combination as an alkylene group, thus forming a heterocyclic ring structure. When such a heterocyclic ring is present, the ring must contain 5 or 6 nuclear atoms in all.

Typical amide-type solvents corresponding to the above structural formula are dimethyl acetamide (Z is >C=O); N,N,N',N'-tetramethyl urea (Z is >C=O); N-acetyl pyrrolidine (Z is >C=O); N-methyl-α-pyrrolidone (Z is >C=O) and hexamethylphosphoramide

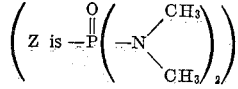

Other solvents include N-dimethyl propionamide, N,N-diethyl acetamide, N-ethyl pyrrolidone, and dimethyl butyramide. These amide-type solvents act as their own acid acceptor, and no additional acceptor is required, although one may be included if other considerations call for it. When the amide type of solvent is used, without other acceptor, the acid acceptor salt formed is an amide salt.

The high molecular weight polymer of this invention is termed "an aromatic polyamide." This term refers to a polymer wherein repeating units are linked by a carbonamide group, i.e., the

radical, the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic. The term "aromatic ring" means a carbocyclic ring possessing resonance. Exemplary aromatic radicals have the following structural formulas

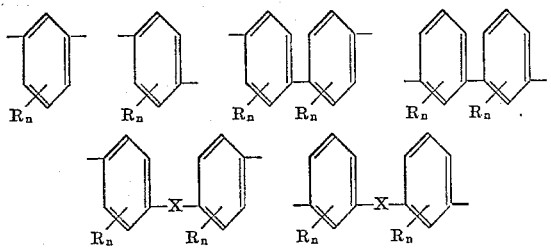

in which R is preferably a lower alkyl, lower alkoxy, or halogen group, $n$ is a number from 0–4, inclusive, and X is preferably one of the groups of

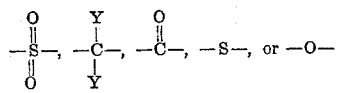

in which Y is a hydrogen or a lower alkyl group. X may also be a lower alkylene or lower alkylene dioxy group although these are somewhat less desirable. R may also be a nitro, lower carbalkoxy, or other non-reactive group. All of these aromatic radicals are divalent and meta or para oriented; i.e., the unsatisfied bonds of the radicals (the "chain-extending bonds" when the radical is viewed in the repeating unit of the structural formula of the polymer) are meta or para oriented with respect to each other. One or more of the aromatic radicals may contain substituent group as indicated, and any aromatic ring may contain two or more of the same or different substituent groups. Preferable, however, are high molecular weight polymers in which the aromatic radicals are unsubstituted or contain only lower alkyl groups attached to any one ring. The term "non-reactive groups" refers to groups which do not react with aromatic amino or aromatic carboxylic halide during the polymerization reaction herein disclosed. The term "chain-extending bond" refers to any bond in the polyamide which, if broken, would decrease the length of the polymer chain.

High molecular weight polymers of this invention are prepared by reacting an aromatic diacid halide with an aromatic diamine, the acid groups of the diacid halide and the amine groups of the diamine being meta or para oriented relative to each other, at low temperatures (below 100° C.).

The diacid halide of the dibasic aromatic acid useful as a reactant in the polymerization of the present invention includes compounds of the formula

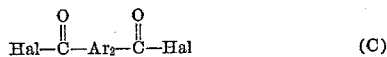

wherein $Ar_2$ is a divalent aromatic radical; i.e., it contains resonant unsaturation, and Hal is a halogen atom from the class consisting of chlorine, bromine, and fluorine. The diacid chloride is preferred. The aromatic radical may have a single, multiple, or fused ring structure. One or more hydrogens of the aromatic nucleus may be replaced by non-reactive groups such as lower alkyl, lower alkoxy, halogen, nitro, sulfonyl, lower carbalkoxy, and the like. The terms "lower alkyl" and "lower alkoxy" and "lower carbalkoxy" refer to groups containing less than five carbon atoms.

Diacid chlorides which may be utilized to prepare the polyamides of this invention include isophthaloyl chloride and lower alkyl isophthaloyl chlorides, such as methyl-, ethyl-, propyl-, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. The total number of carbon atoms in the substituents attached to the aromatic ring should not exceed nine. It is not necessary that all of the alkyl substituent groups be the same because compounds such as 2-methyl-4-ethyl isophthaloyl chloride and 2 - methyl - 4 - ethyl - 5 - propyl isophthaloyl chloride may be utilized, the total number of carbon atoms in all the substituent groups (non-reactive groups) attached to the aromatic ring in the latter two compounds being 3 and 6, respectively. In place of an alkyl group, the aromatic ring in isophthaloyl chloride may be substituted with one or more lower alkoxy groups such, as for example, methoxy-, ethoxy-, propoxy-, butoxy-, etc., isophthaloyl chlorides. As with alkyl-substituted isophthaloyl chlorides it is desirable that the total number of carbon atoms in the alkoxy groups attached to the aromatic ring be less than about five, but it is not necessary that all of the alkoxy groups be the same. Representative of such compounds are dimethoxy-, trimethoxy-, tetramethoxy-, and diethoxy-isophthaloyl chlorides, and 2 - methoxy - 4 - ethoxy isophthaloyl chloride. Halogen-substituted isophthaloyl chlorides as exemplified by chloro-, bromo-, and fluoro-isophthaloyl chlorides may be used. More than one halogen may be attached to the aromatic ring and dihalo isophthaloyl chlorides, such as dichloro-, dibromo-, difluoro-, or chlorobromo-, chlorofluoro-isophthaloyl chlorides are useful as are similar trihalo and tetrahalo isophthaloyl chlorides, The halogens in these compounds may be the same or different as in the case of the dihalo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups so long as the total number of carbon atoms in the substituents attached to the aromatic ring does not exceed nine. Thus, it will be apparent that the aromatic radical of the isophthaloyl chloride may contain one or more or any combination of lower alkyl, lower alkoxy, halogen, nitro, phenyl, lower carbalkoxy, or other nonreactive groups.

In addition to isophthaloyl chlorides and substituted isophthaloyl chlorides specified above, corresponding unsubstituted and substituted terephthaloyl chloride may also be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed nine. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc., terephthaloyl chlorides, chloro-, bromo-, dichloro-, chlorobromo-, etc., terephthaloyl chlorides, and nitro and lower carbalkoxy-terephthaloyl chlorides.

In addition to the single ring diacid chlorides specified above, multiple ring diacid chlorides in which the acid chloride groups are oriented meta or para with respect to each other are also useful in this invention. Exemplary of such compounds are 4,4'-oxydibenzoyl chloride, 4,4'- sulfonyldibenzoyl chloride, 4,4'-dibenzoyl chloride, 3,3'-oxydibenzoyl chloride, 3,3'-sulfonyldibenzoyl chloride, and 3,3'-dibenzoyl chloride, the corresponding bromides and fluorides, and similar compounds in which one or both of the aromatic rings contains one or more or a combination of lower alkyl, lower alkoxy, halogen, nitro, sulfonyl, and lower carbalkoxy groups.

The diamines useful as reactants in forming the polymer of this invention are compounds of the formula H$_2$N—Ar$_1$—NH$_2$ wherein Ar$_1$ is a divalent aromatic radical as defined above and the NH$_2$ groups are oriented meta or para with respect to each other. The diamines may contain single or multiple rings as well as fused rings. One or more hydrogens of the aromatic nucleus may be replaced by non-reactive groups such as lower alkyl, lower alkoxy, halogen, nitro, sulfonyl, lower carbalkoxy as mentioned above. The aromatic nucleus of the diamines may be identical to any of the aromatic radicals mentioned above for the diacid chlorides, and the diamine utilized in any given instance may contain the same or different aromatic radical as the diacid chloride utilized. The total number of carbon atoms in the substituent groups attached to any aromatic ring should not exceed nine.

Exemplary diamines which may be utilized in this invention include meta-phenylene diamine and lower alkyl substituted meta-phenylene diamine such as methyl-, ethyl-, propyl-, etc., meta-phenylene diamine. There may be more than one alkyl group attached to the aromatic ring as in the case of dimethyl, trimethyl, tetramethyl, diethyl, triethyl, and triisopropyl meta-phenylene diamine. The alkyl substituent groups need not be the same because compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy-, ethoxy-, propoxy-, butoxy-, etc., meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenylene diamine as exemplified by chloro, bromo, and fluoro meta-phenylene diamine may be utilized. More than one species of halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups so long as the total number of carbon atoms in the substituents attached to an aromatic ring does not exceed nine. Where more than one substituent group is attached to an aromatic ring, best results are obtained with alkyl and alkoxy groups.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring so long as the total number of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4'-oxydiphenyldiamine, 4,4'-sulfonyldiphenyldiamine, 4,4'-diphenyldiamine, 3,3'-oxydiphenyldiamine, 3,3'-sulfonyldiphenyldiamine, and 3,3'-diphenyldiamine, and the corresponding compounds in which one or both of the aromatic rings contains one or more or a combination of lower alkyl, lower alkoxy, halogen, nitro, sulfonyl, lower carbalkoxy groups and the total number of carbon atoms in the substituent groups attached to an aromatic ring does not exceed nine.

A diamine and diacid chloride are reacted in accordance with this invention to produce a high molecular weight linear polyamide having a structural unit corresponding to the diamine and diacid chloride utilized. For example, para-phenylenediamine reacts with isophthaloyl chloride to produce a polymer characterized by the following structural unit

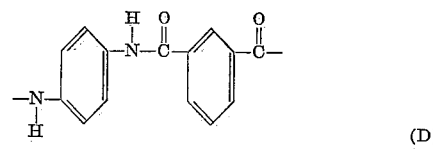

and having an inherent viscosity greater than about 0.6. Similarly, other diamines and diacid chlorides react to produce polyamides with corresponding aromatic nuclei. The structure of the polyamide is indicated by the fact that in accordance with this invention two aromatic bifunctional reactants (aromatic diacid halide and aromatic diamine) combine in equivalent amounts under very mild reaction conditions to form a polymer that is dissolved and unchanged in unreactive solvents, and is orientable and generally crystallizable in film and fiber form. The structure of the polymer is confirmed by infrared spectra analysis.

In preparing the polymers of this invention two or more aromatic diamines or two or more aromatic diacid compounds of the structures already described can be employed in place of a single diamine and single dibasic acid compound. In addition, up to about 10% polymer-forming ingredients which may or may not contain an aromatic nucleus can be included without seriously detracting from the extraordinary physical and chemical properties of the polymers of this invention. Preferably, however, the diamine and diacid compounds utilized will be wholly aromatic, thus resulting in a polymer characterized entirely by structural units with all of the nuclei containing aromatic radicals.

Polymers of this invention are characterized by an exceptionally high melting point. Whereas most known polyamides melt at temperatures below about 270° C., generally the polyamides of this invention have melting points in excess of 300° C. and in many instances above 350° C. Moreover, filaments of polyamides of this invention retain their filament form and good filament strength at temperatures of at least about 300° C. Polymers of this invention are also distinguished from known polyamides in having a combination of water-white color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their unusual and surprising solubility for such high melting polymers, these polymers may be processed into shaped structures such as films and filaments by conventional techniques. These polymers have high tenacity, good work recovery, high flex life at elevated temperatures and are readily crystallizable.

The polymers of this invention find application in a wide variety of physical shapes and forms. Among the most significant of these forms are fibers and films. The useful combination of desirable physical and chemical characteristics of these polymers are unique. Fibers and films of these polymers not only possess excellent physical properties at room temperatures, but retain their strength and excellent response to work-loading at elevated temperatures for prolonged periods of time. Behavior of this type offers commercial utility in a wide range of end uses. In fiber form the polymers offer possibilities for high temperature electric insulation, protective clothing and curtains, filtration media, packaging and gasketing materials, brake linings and clutch facings. In the aircraft industry these materials can be used in parachutes, fuel cells, tires, ducts, hoses and insulation. In atomic energy applications the remarkable resistance to radiation with retention of physical properties as well as thermal stability is important. Cordage for tires and conveyor belts, particularly where such materials would be subject to prolonged high temperature exposure is another application. Press cloths in the dry cleaning industry prepared from such fibers have extreme hydrolytic stability. In the form of films, these polymers may be used in automotive and aviation interior head lining materials, decorative trim, high temperature electrical insulation, such as for slot liners, use in dry transformers, capacitors, cable wrappings, etc., packaging of items to be exposed to high temperature or high energy radiation while within the package, corrosion resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets or foils, mold liners or self-sustaining containers for casting low-melting (below 300° C.) fusible materials, including metals, and a variety of other similar and related uses. Valuable flexible materials similar in function to putty with outstanding high temperature stability can be made by combining fibers prepared from polymers of the present invention with flexible high-temperature polymers such as plasticized chlorotrifluoroethylene polymers.

Films formed from polymers of this invention may be stretched or otherwise oriented according to conventional procedures. Films may be oriented biaxially by stretching or rolling in both directions or by rolling in one direction and stretching in the other.

The following examples illustrate the invention. All parts and percentages are by weight unless otherwise indicated. Values of inherent viscosity are determined in sulfuric acid (sp. gr. 1.841 at 60° F.), at 30° C. at a concentration of 0.5 gram polymer per 100 cc. of solution. All polymers of this invention have an inherent viscosity of at least about 0.6 on this basis and a melting point of at least about 300° C.

a polymer melt temperature of 375° C. It is obtained in 91% yield.

The polymer prepared as above is dissolved to a concentration of 17% in a mixture of 95 parts dimethylformamide and 5 parts lithium chloride. This solution at 128° C. is spun through a 5-hole spinneret, in which the orifice has a diameter of 0.10 mm., into an air column maintained at 225° C. Fiber, wound up at the rate of 92 yards per minute is thereafter drawn to approximately 4.75 times its original length and boiled off in water. The final fiber has a tenacity of 4.9 grams per denier, with a 30% elongation at the break.

Another sample of the same polymer is dissolved in a mixture of 95% dimethylformamide and 5% lithium chloride to give a 15% polymer solution. This solution is cast into a film. The solvent is flashed off in a hot oven at 150° C. The resulting film is leached in hot water to remove residual dimethylformamide and salt. Test strips of the wet film are clamped in frames prior to drying in a vacuum. Physical properties of the films at various temperatures are reported in the table below:

Table 1

| Temperature, °C. | Tensile strength (p.s.i.) | Modulus (p.s.i.) | Percent elongation |
|---|---|---|---|
| 20 | 12,000 | 500,000 | 3- 5 |
| 150 | 7,500 | 350,000 | 5-10 |
| 200 | 7,000 | 350,000 | 8-15 |

The film is also noted to have a high dielectric constant which drops off only fractionally at temperatures as high as 200° C., while commercially available insulating materials such as polyethylene or rubber are either completely destroyed or become molten at such temperatures.

In order to illustrate the non-flammable nature of the polymers, a sample of fiber such as prepared above is subjected to a standard flammability test (A.A.T.C. 45° angle test, American Handbook of Synthetic Textiles, 1st Ed. (1952), Textile Book Publishers Inc., N.Y.) along with a cotton fiber control. Both fibers are knit into tubes and exposed to an open flame until ignited, at which time the flame is removed. Test results are shown in the table below:

Table 2

FLAMMABILITY OF KNIT FABRICS

| Sample | Ignition time, sec. | Total time to burn | Dimensions char zone (inches) | Type of burning | Type of residue |
|---|---|---|---|---|---|
| Fiber of Ex. I (five samples) | 3.8 | Went out (5.4 sec.) | 0.35 x 0.30 | Slow ignition, negligible burning period. | Crusty, hard. |
| Cotton fiber (five samples) | 2 | 13 to 430 sec. | 1.5 x 6, sample burned completely. | Rapid ignition, quick flaming, glowing char slowly disintegrates. | Feathery. |

The first group of examples illustrates the operation of one preferred embodiment of this invention, that employing halogenated hydrocarbons and cyclic methylene sulfones as reaction media.

EXAMPLE I

Meta-phenylenediamine dihydrochloride in the amount of 5.4 parts is placed in a reaction vessel fitted with a high speed stirrer and a solution of 12.1 parts of triethylamine in 200 parts methylene chloride is added rapidly. Triethylamine hydrochloride is formed in situ. The mixture is stirred for one minute to dissolve the diamine salt. 6.1 parts of isophthaloyl chloride in 200 parts of methylene chloride is then added. Polymerization is completed and poly(meta-phenylene isophthalamide) is precipitated by addition of a volume of hexane equal to the volume of the reaction mass. The product is water-white and has an inherent viscosity of 1.71 and As can be seen, the fiber of this invention is outstandingly superior to cotton in flame resistance. In similar tests, the fibers of this invention were compared to other commercial synthetic fibers, and proved more difficult to ignite and in addition were self-extinguishing. A sample of a fabric from poly(hexamethylene adipamide) yarn was burned to the extent of ⅔ of the fabric area, while the fabric prepared from fibers of Example I was charred for less than ⅒ of its area.

Another sample of the same polymer is dissolved in a mixture of 80.75 parts of dimethylformamide and 4.25 parts lithium chloride to give a 15% polymer solution. This solution is cast into a film using a doctor blade allowing 15 mils clearance. Solvent is flashed off in a hot vacuum oven. Resulting film is oriented by hot-rolling in a direction perpendicular to the direction of casting and then hot-rolled at a 90° angle to that direction, producing a biaxially oriented film. Physical properties of this film are shown in Table 3 below:

Table 3

|  | Direction of first rolling | Direction of second rolling |
| --- | --- | --- |
| Modulus, lbs./in | 900,000 | 700,000 |
| Tenacity, lbs./in | 30,000 | 22,000 |
| Elongation, percent | 10 | 4.5 |

EXAMPLE II

Poly(4-methyl-meta-phenylene isophthalamide) is made in a Waring Blendor by adding 4.06 parts of the isophthaloyl chloride in 200 parts of methylene chloride to a solution of 2.4 parts of 4-methyl-meta-phenylene diamine, 4.1 parts of triethylamine and 3.7 parts of triethylamine hydrochloride in 130 parts of methylene chloride and stirring for 10 minutes. Polymer having a water-white color, an inherent viscosity of 1.64, a polymer melt temperature of 300° C. and soluble in both dimethylformamide and dimethylacetamide, is obtained in a 76% yield. Is is dry spun from dimethylformamide and the yarn drawn three times its original length. Samples of this yarn together with comparative controls are exposed, for various periods, to (A) air at 170° C. containing 5% steam, and (B) air at 175° C. containing 5% steam and 5% sulfur dioxide. Tenacities of the samples A and B are reported in Tables 4 and 5, respectively.

Table 4

| Yarn | Exposure time (days) | Retained tenacity (percent) |
| --- | --- | --- |
| Poly(m-phenylene isophthalamide) | 6 | 85 |
| Poly(methyl-m-phenylene isophthalamide) | 6 | 45 |
| Poly(ethylene terephthalate) | 6 | 19 |
| Poly(hexamethylene adipamide) | 4 | (¹) |

¹ Too weak to test.

Table 5

| Yarn | Exposure time (days) | Retained tenacity (percent) |
| --- | --- | --- |
| Poly(m-phenylene isophthalamide) | 6 | 70 |
| Poly(methyl-m-phenylene isophthalamide) | 3 | 49 |
| Poly(ethylene terephthalate) | 1 | (¹) |
| Poly(hexamethylene adipamide) | 1 | (¹) |

¹ Too weak to test.

The low temperature, solvent polymerization technique illustrated in Examples I and II may be utilized to form all the aromatic polyamides of this invention. In this process an aromatic diacid halide and an aromatic diamine, as defined herein, are condensed to a high molecular weight linear polyamide having a recurring structural unit corresponding to the diamine and diacid chloride. The process is carried out in the presence of an organic acid acceptor and in a liquid reaction medium which is a solvent for each of the reactants and for the acid acceptor and which medium has an average solute-solvent interaction energy (K av.) with complementary model compounds as defined hereinafter, of less than about 1100 calories per mole. The energy in calories per mole of solute-solvent interaction between the medium employed containing the concentration of organic acid-acceptor salt that will form in the proposed polymerization and a complementary model compound is determined according to the expression:

$$4.57T \log_{10}\frac{1}{x_2} = \Delta H_f\left(1 - \frac{T}{T_m}\right) + K(1-x_2)^2$$

wherein K is the energy in calories per mole of solute-solvent interaction between a model compound and the medium, T is the temperature in degrees absolute required to form a clear solution of a model compound in the medium at mole fraction concentration $x_2$, $T_m$ is the melting point of the model compound in degrees absolute and $\Delta H_f$ is the heat of fusion of the model compound in calories per mole.

By the term "complementary model compounds" is meant low molecular weight diamides devoid of terminal polyamide-forming groups and having the formulas:

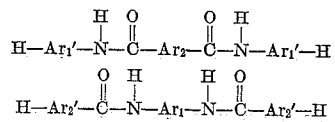

where $Ar_1$ and $Ar_2$ are divalent aromatic radicals as previously described, each such radical corresponding to a recurring unit in the polymer to be prepared. $Ar_1'$ and $Ar_2'$ correspond to $Ar_1$ and $Ar_2$, respectively, except that $Ar_1'$ and $Ar_2'$ are always single ring aromatic radicals (such as phenyl, alkyl phenyl, alkoxy phenyl, etc.) free from nitro, sulfo, halogen, and aromatic substituent groups. When $Ar_1$ and $Ar_2$ contain the latter substituent groups, $Ar_1'$ and $Ar_2'$ correspond to $Ar_1$ and $Ar_2$ with these groups absent. Typical model compounds of Formula a are

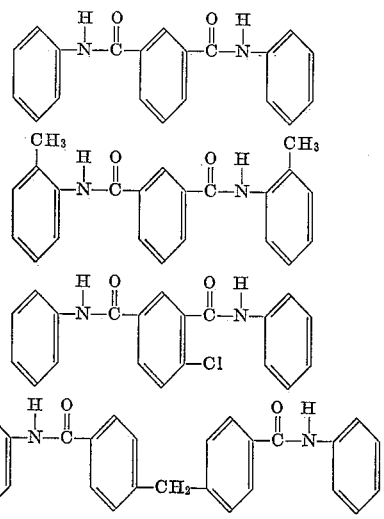

Typical compounds of Formula b, complementary to (1), (2), (3), and (4) listed above are:

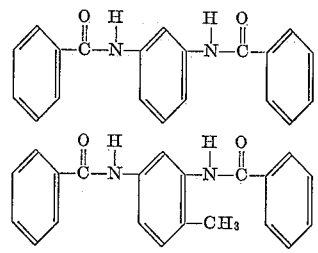

In accordance with the previous definition, compounds (1), (3), and (4) are complementary to (5), and compound (2) is complementary to (6). Many other complementary pairs are possible, the above being merely illustrative.

The following examples further illustrate the solution process for preparing polymers of this invention. The heat of fusion as reported in the examples is the thermal energy in calories necessary to change one mole of the compound from the solid state to the liquid state at the melting temperature. Suitable methods for the measurement of this property are described in "An Advanced Treatise on Physical Chemistry," Volume III—"The Properties of Solids," pages 466–471, by J. R. Partington (Longmans, Green and Company, New York, 1952).

Melting point determinations are made by conventional procedures such as described in "The Systematic Identification of Organic Compounds," pages 85–87, by R. L. Schriner and R. E. Fuson (John Wiley and Sons, New York, third edition, 1940). The temperature in degrees absolute required to form a clear solution of a model compound in the chosen medium at mole fraction concentration $x_2$ is determined by choosing a suitable concentration level and gradually warming the mixture of model compound and solvent in a sealed tube with agitation until a clear solution is obtained. The inherent viscosity values of the polymers are given as an indication of the degree of polymerization obtained. In view of the relative ease with which these values are determined they provide a useful method of evaluating the effect of process solvent variation on the polymerization. The values may be misleading when used to compare different types of polymers but in general aromatic polymers of the class defined herein have an inherent viscosity of at least about 0.6 in sulfuric acid and a melt temperature of at least 300° C. Such polymers may be used as films, in coating compositions and in paint formulae. Polymers having an inherent viscosity of at least 0.8 are particularly valuable because they can be formed into fibers. Inherent viscosity values are determined by measuring viscometer flow periods at 30.0±0.1° C. for sulfuric acid (sp. g. 1.841 at 60° F.) and for a solution of the polymer in sulfuric acid at a concentration of 0.5 gram per 100 cubic centimeters of solution. The inherent viscosity value is then calcuated as 2 times the natural logarithm of the relative viscosity of the solution compared to that of the pure solvent. Polymer melt temperature is the minimum temperature at which a sample of the polymer leaves a wet, molten trail as it is stroked with moderate pressures across a smooth surface of a heated block.

EXAMPLE III

Tetramethylene sulfone is evaluated as a reaction medium for reacting meta-phenylenediamine and isophthaloyl chloride using N-methylmorpholine as the acid acceptor. The model compounds employed are (1) and (5). The values of T, $x_2$, and K and K av. are given in the table below.

Table 6

| Model compounds | (1) | (5) |
|---|---|---|
| T−273, degrees | 136 | 85.8 |
| $x_2$ | 1.79 | 1.79 |
| K | +175 | −800 |

Note.—K av.= −310 calories/mole.

This value of K av. being less than the maximum value of about 1100 calories per mole classifies the solvent as among the reaction media defined by the present invention.

In the preparation of the polymer 2.162 parts of meta-phenylene diamine and 4.10 parts of methylmorpholine are dissolved in 63.5 parts of tetramethylene sulfone, the solution being made in an Erlenmeyer flask equipped with a magnetic stirrer. 4.06 parts of isophthaloyl chloride in 38.1 parts of tetramethylene sulfone is added to the previously prepared solution over a period of 3 minutes. An additional 25.4 parts of tetramethylene sulfone is used as a rinse for acid chloride. A clear solution forms. It becomes viscous as polymerization proceeds with slight elimination of heat. At the end of 10 minutes, the product is precipitated by addition of water. The fibrous flake material resulting is obtained in a 100% yield of poly-(meta-phenylene isophthalamide) having an inherent viscosity of 0.92.

When the above polymerization is repeated substituting 2,4-dimethyltetramethylene sulfone for tetramethylene sulfone and employing N,N'-diethylaniline in place of methylmorpholine as acid acceptor, a 100% yield of product is obtained which has an inherent viscosity of 1.2.

When the above polymerization is repeated substituting dimethyltetramethylene sulfone for the tetramethylene sulfone as a reaction medium and substituting pyridine for methylmorpholine as acid acceptor, a product having an inherent viscosity of 0.8 is obtained. Triethylamine, used as the acceptor in this system, yielded 100% polymer with an inherent viscosity of 3.0.

EXAMPLE IV

Polymer is prepared by dissolving 1.98 parts of bis(4-aminophenyl)methane and 3.04 parts of diethylaniline in 56.6 parts of dimethyltetramethylene sulfone. To this mixture, 2.03 parts of isophthaloyl chloride dissolved in 34 parts of dimethyltetramethylene sulfone is added over a period of about 1 minute with rapid agitation. An additional 11.3 parts of solvent reaction medium is used as a rinse for the isophthaloyl chloride solution. The reaction mass is stirred for about 10 minutes producing a clear solution from which a fibrous product is precipitated when the solution is added to water. A 100% yield of poly(bis 4-phenylene)methane isophthalamide having an inherent viscosity of 1.4 and a polymer melt temperature of 400° C. is obtained.

Another batch of the same polymer is prepared except that a total of only 45.3 parts of reaction medium is employed. The very viscous clear solution which is obtained is wet-spun into fibers in a water bath maintained at 20° C. using a ten-hole spinneret, each orifice of which is 6 mil in diameter. The fibers have an inherent viscosity of 2.51.

A solution of the polymer in dimethylformamide is dry-spun into a white and lustrous yarn having a tenacity of 4.1 grams per denier and a 20% elongation.

In another embodiment of the solution polymerization process of the present invention is carried out in the presence of excess acid salt of an organic tertiary amine. Generally it is desirable that the salt be of the same organic amine as is used as an acid acceptor. As much as a 500% excess or more over and above the acid salt which will form during the course of the reaction may be used without interfering with the normal course of the reaction. Conveniently, from about 50 to 100% excess of organic amine acid salt over and above that which will be theoretically formed during the course of the reaction is employed. The average solute-solvent interaction energy (K av.) is suitable for defining an acceptable solvent in this embodiment of the process. In solution polymerization reactions of this invention, the solute-solvent ineraction energy (K) for each model compound is measured in the presence of the concentration of acid salt and model compound that will be present at the conclusion of the polymerization.

The following examples illustrate preparation of polymers of this invention by low temperature solvent polymerization in the presence of excess organic amine acid salt.

EXAMPLE V

Chloroform is a suitable reaction medium for the production of a fiber-forming aromatic polyamide of high polymer melt temperature from meta-phenylene diamine and isophthaloyl chloride using triethylamine as acid acceptor and from 30–100% excess of triethylamine hydrochloride. Complementary model compounds (1) and (5) whose melting points and heats of fusion are listed in Example III above are employed. Since in the ultimate polymerization it is desired that the polymer concentration be 2.63 mole percent, the value of T of the solute-solvent interaction energy formula is determined at that mole percent concentration and in the presence of a triethylamine hydrochloride concentration of 10.5 mole percent. Model compound (1) forms a clear solution at 116° C. and substituting in the formula is calculated to possess a solute-solvent inter-action energy (K) of −730 calories per mole. Model compound (5) forms a clear solution in the chloroform triethylamine hydrochloride solvent at 121° C., corresponding to a solute-solvent interaction energy (K) value of +10 calories per mole. The value of (K av.) is thus −360 calories per mole, well below the limit of about 1100 calories per mole.

In the polymerization a 500 ml. round bottom flask equipped with a low speed stirrer and dropping funnel is charged with 2.163 parts of meta-phenylene diamine, 4.09 parts triethylamine, 5.506 parts triethylamine hydrochloride and 54 parts of washed and dried chloroform (the free tertiary amine is the theoretical equivalent of hydrochloric acid to be liberated during the condensation reaction. 5.506 parts of amine salt represent a 100% excess of salt over that to be formed from the free amine).

4.06 parts of isophthaloyl chloride in 21 parts of chloroform is added from a dropping funnel over a period of 15 minutes, the slowly stirred reaction mixture being maintained at a temperature of below 30° C. An additional 4.5 parts of chloroform, used to wash the funnel, is added to the reaction mixture. After 20 minutes, the reaction mass which is clear and extremely viscous is poured into petroleum ether, yielding a fibrous flake which is thereafter washed with hot water. A 99% yield of product, having an inherent viscosity of 1.9 and a polymer melt temperature above 300° C., is obtained.

EXAMPLE VI

Methylene chloride is a suitable reaction medium for the production of a fiber-forming aromatic polyamide of high polymer melt temperature from meta-phenylene diamine and isophthaloyl chloride using triethylamine as acid acceptor in the presence of a 50% excess of triethylamine hydrochloride. The complementary model compounds of Example V are employed. Since in the completed polymerization reaction mass it is desired that the polymer concentration be 0.62 mole percent, the value of T of the solute-solvent interaction energy formula is determined at that mole concentration and in the presence of a triethylamine hydrochloride concentration of 1.8 mole percent. Model compound (1) forms a clear solution at 103° C., corresponding to a solute-solvent interaction energy (K) of +40 calories per mole. Model compound (5) forms a clear solution in methylene chloride at 104.5° C. This represents a solute-solution interaction energy (K) of +600 calories per mole. The average solute-solvent interaction energy is, therefore, +320 calories per mole.

The polymerization is performed by placing 2.16 parts of meta-phenylene diamine, 4.08 parts of triethylamine, 2.5 parts of triethylamine hydrochloride, and 143 parts of methylene chloride in a Waring Blendor. 4.06 parts of isophthaloyl chloride dissolved in 129 parts of methylene chloride is added to the moderately stirred reaction mass over a period of 8 seconds, the reaction mass being maintained at 25° C. 14 additional parts of methylene chloride used to wash isophthaloyl chloride is added in two equal parts. A precipitate of polymer forms immediately. At the end of 7 minutes a volume of hexane equal to the volume of reaction mass is added to assist in precipitation of product. The polymer is obtained in 97% yield, having an inherent viscosity of 1.54 and a polymer melt temperature of 375° C.

EXAMPLE VII

Fiber-forming poly(meta-phenylene chloroisophthalamide) of high polymer melt temperature is prepared using methylene chloride as the reaction medium, in the presence of triethylamine as acid acceptor and in the presence of 100% excess triethylamine hydrochloride. Complementary model compounds are (3) and (5). In classifying the solvent with model compound (3) the following values are obtained:

Table 7

$T_m - 273 = 246$
$\Delta H_f = 9300$ calories per mole
$T - 273 = 35$
$x_2 = 0.00910$
$K = -900$ calories per mole Model compound (5) is shown in Example VI above to have a K of +600 calories per mole in the same solvent.

In preparing the polymer, 7.12 parts of 4-chloroisophthaloyl chloride in 143 parts of methylene chloride is added to a Waring Blendor containing 5.43 parts of meta-phenylene diamine dihydrochloride, 12.14 parts of triethylamine and 143 parts of methylene chloride. After stirring for 10 minutes, polymer having an inherent viscosity of 0.84 and a polymer melt temperature of 305° C. is obtained.

EXAMPLE VIII

A nuclear substituted aromatic polyamide of high molecular weight and high polymer melt temperature, the nuclear substituents being lower alkyl or lower alkoxy, can be prepared in the some reaction medium and under the same conditions as the unsubstituted polymer. For instance, methylene chloride using triethylamine as an acid acceptor and in the presence of 50% excess triethylamine hydrochloride is suitable for the preparation of poly(4-methyl meta-phenylene isophthalamide) since the same system is suitable for poly(meta-phenylenediamine isophthalamide) as shown in Example VII. The suitability of the system is confirmed by K value determinations on model compounds (5) and (6) as shown below:

Table 8

| Compounds | (5) | (6) |
|---|---|---|
| $T_m - 273$ | 244 | 227.5 |
| $\Delta H_f$, cal./mole | 11,900 | 13,100 |
| $T - 273$ [1] | 107 | 87 |
| $x_2$ | 0.00676 | 0.00676 |
| $K$, cal./mole | +620 | −110 |

[1] Measured in the presence of a 50% excess of salt (1.804 mole percent)

Since model (6) is at least as soluble as model (5) and the latter represents a system which will form high molecular weight poly(meta-phenylene isophthalamide) (see Example VII), the test with model (6) alone is adequate to show that a high molecular weight polyamide may be formed from 4-methyl meta-phenylene diamine and isophthaloyl chloride in the same solvent medium (methylene chloride plus 50% excess triethylamine hydrochloride).

Polymer is prepared in a 2-liter flask equipped with stirrer, condenser and dropping funnel. A charge of 7.32 parts of 4-methyl meta-phenylene diamine, 11.1 parts of triethylamine hydrochloride, 12.3 parts of triethylamine and 430 parts of methylene chloride is placed in the flask. A solution of 12.2 parts of isophthaloyl chloride in 500 parts of methylene chloride is added over a period of about 10 seconds. Moderate stirring is continued for three minutes after which additional portions of each reactant, i.e., (a) 7.32 parts of the diamine and 12.3 parts of triethylamine in 322 parts of methylene chloride and (b) 12.2 parts of the acid chloride in 322 parts of methylene chloride, are added simultaneously over a period of about 30 seconds. After 10 minutes, polymer having an inherent viscosity of 2.30 and a polymer melt temperature of 330° C. is obtained.

EXAMPLE IX

A solution of 6.1 parts of isophthaloyl chloride in 200 parts of methylene choride is added to a Waring Blendor simultaneously with a solution of 6.33 parts of 4-methoxy-metaphenylenediamine monohydrochloride and 12.1 parts of triethylamine in 200 parts of methylene chloride. After 10 minutes, polymer having an inherent viscosity of 0.84 and a polymer melt temperature above 300° C. is recovered. It is soluble in dimethylformamide from which strong, transparent, flexible films are formed by casting.

The polymers of this invention may also be prepared by a polymerization procedure wherein one or both of the reactants is a mixture of diamine or diacid chloride. According to this embodiment, reaction conditions and suitable reaction media are classified by determining the solute-solvent interaction energy (K) of a model of each reactant and the average interaction energy (Kav.) while taking into consideration the proportion of reactant represented by each model. The example below illustrates the preparation of copolymers.

EXAMPLE X

A copolymer of meta-phenylene diamine and a mixture of isophthaloyl (80 mole percent) and terephthaloyl (20 mole percent) chlorides is prepared by simultaneously adding to a Waring Blendor a solution of 43.9 parts of isophthaloyl chloride, 10.98 parts of terephthaloyl chloride dissolved in 1600 parts of methylene chloride and a solution of 48.87 parts of meta-phenylene diamine hydrochloride, 109.3 parts of triethylamine in 1600 parts of methylene chloride. An additional 400 parts of methylene chloride is used for rinse purposes and added to the reaction mass. After 10 minutes, polymer having an inherent viscosity of 1.44 and a polymer melt temperature of 370° C. is formed.

36 parts of the polymer so prepared is dissolved in 114 parts of dimethylformamide and is extruded through a five-hole spinneret (orifice diameter of 0.004 inch) into a cross-flow air column, the wall temperature of which is maintained at 200° C. The yarn is collected at 158 feet per minute and is drawn 2.75 times its extruded length. It has a tenacity of 3.5 grams per denier, a break elongation of 34% and an initial modulus of 55 grams per denier.

The above polymerization is repeated shifting the proportion of acids to provide 70 mole percent of isophthaloyl chloride and 30 mole percent of terephthaloyl chloride. The product has an inherent viscosity of 1.89. A film of 15 mil thickness is cast from a 15% solution of the polymer in dimethylformamide. The washed and dried structure shows excellent physical properties, particularly as indicated below. Coating compositions comprising a solution of the above copolymers in dimethylformamide when applied to glass or wire fabrics produce excellent high temperature resistance coatings, and fabrics made from fibers of Example III and coated with said coating compositions are excellent high temperature electrical insulators.

*Table 9*

| Temperature, ° C. | Tensile strength (p.s.i.) | Modulus (p.s.i.) | Elongation (percent) |
| --- | --- | --- | --- |
| 20 | 14,600 | 640,000 | 4.05 |
| 150 | 9,850 | 390,000 | 11.8 |
| 200 | 8,100 | 400,000 | 12.3 |

EXAMPLE XI

A copolymer having an inherent viscosity of 1.45 and a polymer melt temperature of 375° C., soluble in dimethylformamide, dimethylacetamide and in N-methyl pyrrolidone is prepared following the technique of Example X and employing 5.14 parts of meta-phenylene diamine dihydrochloride, 0.27 part of para-phenylene diamine dihydrochloride and 6.06 parts of triethylamine dissolved in 150 parts of methylene chloride as one solution and 6.1 parts of isophthaloyl chloride in 150 parts of methylene chloride as the other solution.

EXAMPLE XII

While the invention has been specifically demonstrated in the examples above in terms of isophthaloyl chloride, any aromatic diacyl halide may be employed. The present example illustrates the use of terephthaloyl chloride as a reaction component. The suitability of dimethyltetramethylene sulfone for the preparation of a polyamide from meta-phenylene diamine and terephthaloyl chloride in the presence of triethylamine as acid acceptor is determined by use of appropriate model compounds as described previously. In the preparation of the polymer a solution of 4.06 parts of terephthaloyl chloride in 75 parts of dimethyltetramethylene sulfone is rapidly added to a solution of 2.16 parts of meta-phenylene diamine and 4.04 parts of triethylamine in 75 parts of dimethyltetramethylene sulfone in a Waring Blendor. Polymer precipitates and stirring is continued for ten minutes. The product has an inherent viscosity of 1.04 and a polymer melt temperature above 400° C. It is soluble in concentrated sulfuric acid and in N-methylpyrrolidone containing 5% lithium chloride.

EXAMPLE XIII 4,4'-sulfonyl-diphenyl diamine in the amount of 1.24 parts and 0.88 part of dimethylacetamide are dissolved in 29 parts of tetramethylene sulfone in a flask. 1.015 parts of solid isophthaloyl chloride is added to the solution which has been cooled to 5° C. The mixture is stirred and kept cool for 10 minutes until the rapid evolution of heat subsides. The solution is clear and viscous at this time but shows some increase in viscosity over several hours. The polymer is precipitated in water, washed and dried, and the yield is 98% of theoretical. The inherent viscosity of the polymer is 1.66.

Following the same procedure a polyamide is prepared from 2,2-bis(para-amino phenyl)propane and isopththaloyl chloride.

The process of the present invention is applicable to the preparation of all "aromatic polyamides" as defined previously. In accordance with this process, designated herein as low temperature, solvent polymerization, condensation of aromatic diamine and the diacid halide of a dibasic aromatic acid is accomplished in the presence of an organic acid acceptor and in a liquid reaction medium in which each of the reactants and the acid acceptor is present in the liquid phase. In addition, the reaction medium must possess an average solute-solvent interaction energy with complementary model compounds of less than about 1100 calories per mole. It is preferred that the reaction medium be completely inert toward the reactants employed, and in any case, only a minor level of reactivity between reactants and reaction medium can be tolerated even when the polyamide formation to the fiber-forming stage is rapid.

The reaction medium may be a solvent for the polymer formed. This is convenient when it is desirable to form a shaped article by extrusion of the dissolved polymer and concomitant removal of the solvent. The use of complementary model compounds in the determination of the average energy in calories of solute-solvent interaction between the model and the reaction medium has been previously described in detail. In determining the temperature (T) necessry to form a clear solution of a model compound in a particular solvent the concentration to be employed should represent the concentration of polymer unit at the end of the polymerization reaction. If the liquid dissolves a large quantity of the model compound, a high concentration may be employed, for instance, in the range of 20 to 25 mole percent. If the model compound is only difficultly soluble, to axoid heating to a very high temperature, a lower concentration level, for instance, 1 to 2 mole percent is more desirable. In general, a concentration level of from about 1 to about 20 mole percent is usually suitable. As pointed out previously, this value is determined in the presence of the quantity of acid acceptor salt which it is calculated will be present at the end of the proposed polymerization. If the reaction is to be carried out in the presence of acid acceptor salt of greater concentration than that formed in the reaction, then such excess salt is also added to the solvent medium when determining solute-solvent interaction energies. As has been indicated, two classes of organic liquids are especially preferable in the practice of the present invention. Generally, these two classes have the same applicability to the processes here described, for both classes are made up of solvents which fulfill the requirement essential for the formation of these desired polymers; that is, the solvent-solute-interaction energy, measured as described, is sufficient for high molecular weight polymer to be formed. One of these classes, that comprising halogenated hydrocarbons and cyclic methylene sulfones, requires an additional acid acceptor to combine with the liberated hydrogen halide and form the acid acceptor salt which helps in providing a medium suitable for the formation of high molecular weight polymers.

Another preferred class of solvents does not require a separate acid acceptor, since the solvent itself performs this function. The suitable materials here are those amide-type solvents previously defined by structural formula, and all of these solvents have a K av. of less than 1100 calories per mole as previously defined and required.

By employing these solvents a simplified procedure is available, whereby there can be obtained directly and in a unified system fibers, filaments, and films made from wholly aromatic polyamides directly from the polymer intermediates, without going through the steps of isolating the polymer and redissolving it for later processing.

The following examples illustrate the practice of the present invention using these solvents.

EXAMPLE XIV

A wholly aromatic polyamide is prepared by reaction of meta-phenylene diamine with isophthaloyl chloride using as a solvent, dimethylacetamide. For best results, the dimethylacetamide is distilled prior to use and kept dry until it is used. A determination of K values is made as follows without added salt:

Table 10

|  | Model compound | |
| --- | --- | --- |
|  | (1) | (5) |
| T−273, degrees | 101.8 | 23 |
| $x_2$ | 7.84 | 7.84 |
| $\Delta H_f$ | 11,400 | 11,900 |
| K | −2,200 | −4,200 |

The resulting K av. is −3200 cal./mole, and this value predicts the formation of high polymer. In preparing the polymer, the same level of concentrations is employed. 25.92 parts of meta-phenylene diamine is placed in a round bottom 3-necked flask equipped with a paddle stirrer, a nitrogen inlet and a drying tube. 226 parts of the distilled dimethylacetamide is added. The flask is swept out with nitrogen to remove atmospheric oxygen from the reaction mixture. A slush of Dry Ice and acetone is placed around the flask to chill the solution and in this process the solution in the flask is frozen to a mush. Then, 48.8 parts of isophthaloyl chloride is added all at once, and the Dry Ice bath is replaced by an ice-water bath. Stirring is continued for about 20 minutes to ½ hour. At this point, a very stirrable mass results. There is an excess of dimethylacetamide hydrochloride above what is soluble in the dimethylacetamide in this reaction mixture, and as the result, some of this amide salt is dispersed rather than in solution. About half the calculated amount of amide salt separates. The solution contains approximately 20% of polymer based on dimethylacetamide. The inherent viscosity of the polymer obtained in this reaction is greater than 1.8.

If a clear solution is desired, the above reaction mixture is heated to 60° C. or a suitable amount of water may be added to give a clear viscous liquid. However, because of the reactivity of the HCl, it is not feasible to process this solution further in ordinary stainless steel equipment because the hydrochloric acid present would attack this metal. However, the hydrochloric acid may be removed without precipitation of the polymer by addition of a suitable molar quantity of calcium hydroxide. When this is done, the polymer solution in dimethylacetamide containing a large amount of calcium chloride may be dry spun into fibers by conventional techniques. If less than the molar quantity of calcium hydroxide is employed, a partially neutralized solution is obtained which can then be wet spun into a coagulating bath although dry spinning is not possible. The hydrochloric acid may be neutralized by other methods to form a neutralization product more readily separated from the polymer solution, for example, by passing gaseous ammonia through the reaction mass. This results in the immediate separation of ammonium chloride which is insoluble in dimethylacetamide, and the ammonium chloride can be filtered or centrifuged off. Some difficulty may be encountered in filtering off the ammonium chloride if the polymerization has been carried on with high solids content to obtain a high molecular weight polymer. This is true because such a solution is very viscous. However, if only a major part of the theoretical amount of the acid halide is used and then the reaction is temporarily stopped, ammonia gas can then be passed through the prepolymer mix until the acid is neutralized. Under these circumstances, the ammonium chloride which is precipitated can be filtered fairly easily. Then the filtrate can be degassed by heating or the application of low pressure if more than the required amount of ammonia was added. The remaining amount of acid chloride is then added to complete the polymerization. This reaction mixture contains a small residual amount of hydrogen chloride. Because of this acid, it is not possible to dry spin the solution without extreme corrosion of the spinneret, although as already stated, the solution can readily be wet spun. The small remaining amount of hydrogen chloride can, however, be readily neutralized, for example, with calcium hydroxide and the completely neutralized solution is then quite suitable for wet or dry spinning under any conditions without any corrosive effect on the spinneret. In addition to the use of calcium hydroxide at this stage, other basic materials can be used, such as sodium hydroxide, sodium carbonate and other acid acceptors. An important feature of all these procedures for treating the polymerization reaction mass is that the polymer is never isolated and need never be handled in the dry state. Thus, there is no danger of contaminating the polymer and no need to redissolve it.

Other methods of completely removing the by-product acid halide can readily be developed by those skilled in the art. The foregoing procedure has the advantage that the acid halide combines with the ammonia without generation of water as is usual in neutralization reactions. Moreover, the ammonium chloride product is insoluble, and readily separated.

However, other procedures are also useful, and are appropriate to the process herein described. For example, dimethyl sulfite can be used to react with the acid, forming methanol, methyl chloride, and sulfur dioxide, which is evolved as a gas. Other suitable materials, which react with the acid halide, include inorganic carbonates and hydroxides, mixed inorganic-organic carbonates, epoxides, such as epichlorohydrin, propylene oxide, ethylene oxide and the like, and organic bases such as tertiary amines and urea. Since these acid-active compounds are not employed as acid acceptors during the reaction, but are added when no uncombined diacid halide is present, it will be obvious that selection of suitable materials is not limited by interaction with the polymer-forming acid ingredient. Therefore, a wire range of substances can be employed.

in a small amount of an inert solvent to simplify addition to the diamine solution. The inert solvent (benzene, toluene, etc.) has no effect on the reaction or on the product. The amount of inert solvent is not sufficient to raise the K av. value of the solution above the maximum permissible level of 1100 cal./mole.

*Table 12*

| Example | Diamine | Acid halide | Solvent | Reaction time | Polymer $\eta$ inh. | Comments |
|---|---|---|---|---|---|---|
| XVI | 10.8 parts metaphenylene diamine dissolved in the cold solvent. | 20.3 parts terephthaloyl chloride (solid). | 94.3 parts dimethylacetamide. | 20 min. at 0 °C. | 1.53 ($H_2SO_4$) | Diamine solution chills in Dry Ice before reaction. Polymer precipitates in $H_2O$. |
| XVII | 22.63 parts of 2,2-bis(4-aminophenyl) propane dissolved in cold solvent. | 20.3 parts isophthaloyl chlorine in 16 parts of toluene. | 188 parts dimethylacetamide. | 1½ hrs | 1.66 ($H_2SO_4$) | Reaction procedure similar to Example XIV. Polymer precipitates with $H_2O$. |
| XVIII | 10.8 parts paraphenylene diamine dissolved in solvent, cooled to 5° C. | 20.3 parts of solid isophthaloyl chloride. | 97 parts of N,N,N',N'-tetramethyl urea. | 30 min | 0.63 ($H_2SO_4$) | Manual stirring only is employed. A clear viscous solution is obtained. M.P. above 375° C. |
| XIX | 1.04 parts paraphenylene diamine dissolved in solvent, cooled to 20° C. | 1.96 parts of solid terephthaloyl chloride. | 20 parts of hexamethyl phosphoramide. | 30 min | 1.9 ($H_2SO_4$) | Manual stirring; 100% yield of high molecular weight polymer. |
| XX | 3.24 parts metaphenylene diamine dissolved in solvent. | 6.10 parts of solid isophthaloyl chloride. | 30 parts of N-acetyl pyrrolidine. | 40 min | 0.82 ($H_2SO_4$) | The diamine is dissolved in the solvent and the solution cools to −1° C. in a 4-necked flask. The acid chloride is added over 8–10 minutes. Temperature finally rose to 30° C. A viscous solution, suitable for spinning is obtained. |
| XXI | 1.08 parts (metaphenylene) diamine dissolved in the cold solvent. | 2.03 parts of solid isophthaloyl chloride. | 10.2 parts of N,N-tetramethylene N',N'-dimethyl urea. | 20 min | 0.72 ($H_2SO_4$) | Diamine solution chills in Dry Ice. Solid diacid halide added all at once. The polymer, obtained as a solution, is precipitated in $H_2O$. |

EXAMPLE XV

The preceding experiment is repeated using N-methyl-α-pyrrolidone as solvent. The same model compounds are used. The stoichiometric quantity of N-methyl pyrrolidone hydrochloride salt is added to the solvent. The data for determining K values are given below:

*Table 11*

| | Model compound | |
|---|---|---|
| | (1) | (5) |
| T−273, degrees | 51 | 41 |
| $x_2$ | 7.485 | 7.485 |
| $\Delta H_f$ | 11,400 | 11,900 |
| K | −3,700 | −3,600 |

A K av. value of −3650 is thus obtained, sufficient to guarantee the formation of high molecular weight polymer. Accordingly, a polymerization run is made, similar to that of the previous example. A solution of 32.4 parts of meta-phenylene diamine in 310 parts of N-methyl-α-pyrrolidone is chilled in a 3-necked flask and 61.0 parts of isophthaloyl chloride is added. Reaction is continued for approximately ½ hour, and a solution of a spinnable viscosity (about 20% solids content) is obtained. After decomposition of the amide-salt by treatment with ammonia and filtration of ammonium chloride, the solution is wet-spun into strong white fibers. The polymer has an inherent viscosity of 0.95, measured in concentrated sulfuric acid.

Other examples showing embodiments of the amide-type solvents are given in the table below. Neutralization, as described above, or by other methods, is effective in all cases. In some of the examples, the polymeric product is isolated for analysis and yield determination. In others, the polymer is retained in solution. In some of the examples, the reaction product is a solution of viscosity suitable for spinning into fibers or casting into films. In other cases, dilution or concentration of the solution prior to further processing is desirable. Concentrations of reactants may be modified in all cases to produce a range of polymer solutions.

In some of the examples, the acid reactant is dissolved

EXAMPLE XXII

An attempt is made to polymerize meta-phenylene diamine and isophthaloyl chloride in dimethylformamide. This solvent is taught in the prior art to be a useful solvent for many functions, and it would be supposed that it would promote the formation of high polymer at least as well as, for example, dimethylacetamide. However, when the procedure of Examples XIV and XV is repeated using dimethylformamide, the polyamide product has an inherent viscosity of 0.08, and is obtained in 33% yield. Variations in the procedure give equally poor results.

Poor results are also obtained with diethylformamide (polymer viscosity=0.10) and N-formyl pyrrolidine (no polymer formed).

EXAMPLE XXIII

This example illustrates a combination of the principles already discussed in some detail. An amide solvent is employed with additional acid acceptor. Metaphenylene diamine (3.24 parts) and triethylamine (6.10 parts) are dissolved in 31 parts of N-methyl pyrrolidone and the solution cooled in ice. To this solution in a round-bottom flask is added with stirring 6.10 parts of isophthaloyl chloride over a period of 6 to 7 minutes. The reaction is continued with stirring for 20 minutes while the solution is warmed to room temperature. The polymer is obtained as a clear viscous solution which is spun into fibers. The polymer has an inherent viscosity of 0.80 measured in sulfuric acid.

The following examples illustrate further embodiments of the present invention, in which the reaction medium does not fall into either of the two classes already described. These examples show that any non-reactive organic solvent, with suitable solvent-solute interaction energy (K av.) features, can be used to produce high molecular weight aromatic polyamides.

EXAMPLE XXIV

In the preparation of a fiber-forming polyamide of high melting point from meta-phenylene diamine and isophthaloyl chloride in the presence of triethylamine as acid acceptor, the suitability of dimethylcyanamide as a reaction medium is determined using complementary model compounds (1) and (5), respectively. Model compound (5) is found to have a melting point of 244° C., a heat fusion of 11,900 calories per mole, and a 1.0 mole percent concentration forms a clear solution at 93° C. Substituting in the formula previously presented the energy of solute-solvent interaction (K) is determined to be —130 calories per mole.

Model compound (1) is found to have a melting point of 288.5° C., a heat fusion of 11,400 calories per mole, a 0.99 mole percent concentration gives a clear solution at 124° C., and substituting in the formula the solute-solvent interaction energy (K) is determined to be +310 calories per mole.

From the above the average solute-solvent interaction energy of the complementary model compounds (K av.) is +90 calories per mole. Since this value is no greater than the limit of about 1100 calories per mole as previously noted, the medium is suitable for preparation of fiber-forming polymers of high melting point from the monomers selected.

The poly(meta-phenylene isophthalamide) is prepared as follows: 1.081 parts of meta-phenylene diamine and 2.04 parts of triethylamine are dissolved in 42 parts of dimethylcyanamide in a round-bottom flask. 2.03 parts of solid isophthaloyl chloride is dissolved in the previously formed solution with moderate stirring. After about one minute, precipitation of polymer occurs. This slurry is stirred for 10 minutes and then poured into water. A 100% yield of poly(meta-phenylene isophthalamide) having an inherent viscosity of 0.81 is formed. Structure of the polymer is confirmed by infrared spectra. A film produced from this polymer by casting from solution has a polymer melt temperature of 375° C.

EXAMPLE XXV

Acetonitrile is a suitable reaction medium for the production of a fiber-forming aromatic polyamide of high polymer melt temperature from meta-phenylene diamine and isophthaloyl chloride using triethylamine as acid acceptor in the presence of 26% excess triethylamine hydrochloride. Using model compounds (1) and (5), the value of (K av.) is found to be +535 calories per mole based on the following observations:

*Table 13*

|   | Model compounds | |
|---|---|---|
|   | (1) | (5) |
| T—273 | 113 | 101 |
| $x_2$ | 0.00510 | 0.00510 |
| K | +440 | +630 |

The polymerization technique of Example VI is employed with details as follows:

WARING BLENDOR CHARGE 2.16 parts m-phenylene diamine
4.08 parts triethylamine
1.5 parts triethylamine hydrochloride
117.5 parts acetonitrile (as diamine solvent)
4.06 parts isophthaloyl chloride
31.3 parts acetonitrile (as acid chloride solvent)
7.8 parts acetonitrile (as acid chloride wash)

The resulting polymer, having an inherent viscosity of 1.11 and a polymer melt temperature of 375° C., is obtained in a 99% yield.

When no excess triethylamine hydrochloride is used at a polymer concentration of 0.516 mole percent, giving a K av. on models (1) and (5) of +1100, the resulting polymer has an inherent viscosity of 0.6.

As has been shown in several of the examples, it is frequently found that the end-product of the polymerization process of this invention is a polymer which is in solution in the reaction medium, and such a solution is directly suitable for further processing. Solvents of the amide type already disclosed have uniformly have been found to be solvents for the wholly aromatic polyamides of the present invention. The preceding description of suitable polymerization solvents can also be used to determine good solvents for already-formed polymers. The most useful amide-type solvents are those which have a solute-solvent interaction energy K av. of less than —2000 calories per mole measured on model compounds as already described. Because, in the dissolution of an already-formed polymer, there is no generation of any acid acceptor salt, it is necessary in the measurement of K av. for the purposes of determining solvent power that the measurements be made *without* any acid acceptor salt being present in the solution. Thus, although the general principles and experimental techniques involved in establishing usefulness of an organic liquid as a polymerization medium and a polymer solvent are similar, the precise experimental conditions and the value of K av. which serves as a criterion for success are different. Moreover, in determination of a suitable solvent for already-formed polymer, it is not necessary to consider whether the proposed solvent be coreactive with monomeric polymer-forming intermediate, e.g., aromatic diamines or aromatic diacid halides, since these materials will not be found to be present in a polymer solution.

Specifically, organic solvents having a K av. of less than —2000 calories per mole will be found in the class of organic amides having the formula:

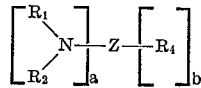

where Z is >C=O or

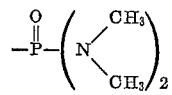

and $R_1$, $R_2$, and $R_4$ may be the same or different. $R_1$ and $R_2$ may be alkyl, alkylene or cyclic alkylene radicals, and $R_4$ is an alkyl, alkylene, cyclic alkylene or hydrogen. The indicated alkylene and cyclic alkylene radicals of $R_1$, $R_2$, and $R_4$ can be combined so that, for example, $R_1$, $R_2$, or $R_1$, and $R_4$ together constitute a cyclic alkylene structure which cyclic structure further contains the Z radical and where such cyclic structures must contains a total of at least 5 and not more than 6 atoms in the ring, and "a" and "b" are so chosen as to satisfy the residual valences of Z, and "a" is 1 or 2, while "b" is 0 or 1. Preferably, such solvents have a total number of carbon atoms in the radicals $R_1$, $R_2$ and $R_4$ not greater than 5 and $R_1$ and $R_2$ are methyl and ethylene radicals. While their solvent power is greatest when they are used to keep the polymer in solution as it is formed, these amide solvents are predictably useful for solutions of wholly aromatic polyamides prepared by the present or by other polymerization processes. In general, these amide solvents will dissolve at least 5% by weight of wholly aromatic polyamides. When the polymer is exposed as it is being formed to the amide solvent, such solvent permits the formation of clear stable solutions containing at least 15% and sometimes as much as 30% solids content.

The polymer solutions of the present invention are a useful class of compositions, the most desirable being those based on the amide-type solvents as already defined. Solutions made by polymerization of the polymer in an amide solvent are particularly preferred, since these solutions are most readily obtained with high solids content.

As illustrated in the examples, the polymer-forming reactants are combined in the reaction medium in the presence of an organic acid acceptor. While many conventional materials of this type may be utilized, one preferred class of acid acceptors is organic tertiary amines, containing not more than one cyclic structure attached to the amine nitrogen, whose base strengths are such that $pK_a \geq 5.25$ (measured in water)

where $$K_a = \frac{(OH_3+)(R_3N)}{(R_3NH+)}$$

and $pK_a = \log_{10} K_a$.

Effectively $pK_a$ is equal to the pH of the aqueous amine solution at the half titration point. Suitable acid acceptors include trimethylamine, triethylamine, ethylpiperidine, diethylbenzylamine, dimethylbenzylamine, ethylmorpholine and methylmorpholine. Polyfunctional tertiary amines, for example, N,N,N',N'-tetramethylhexamethylenediamine, can be used as acid acceptors. Another preferred class of organic acceptors is the class of amide-type structures which have already been indicated as suitable for use as both the solvent medium and the acid acceptor.

The method of combining the two reactants is not critical. Usually, it is more convenient to dissolve the diamine and the acid acceptor in the reaction medium and then add the acid halide which may be dissolved in a separate portion of inert solvent to this first solution with agitation. With the amide-type solvents, it is preferable not to dissolve the diacid halide in the amide solvent prior to the time of addition of the diacid halide. Other techniques, however, may be used. For instance, the two reactants could be added simultaneously to an agitated solution of acid acceptor in reaction medium. Alternatively, the acid acceptor and acid halide might be metered simultaneously to the reaction medium having the diamine dissolved therein in such proportions that the acid acceptor would combine with hydrogen halide as liberated. When the reaction medium is of the already-specified amide type, it may function as its own acid acceptor, and the reaction is simplified since no separate metering or handling of acid acceptor is needed. Best results are achieved when rapid agitation is employed to mix the reactants. The precise degree of agitation is not critical, but in general, if the stirring is violent enough to produce visible turbulence in the liquid mass, a superior product can be obtained. Excellent results can be achieved with a "Lightnin" propeller-type stirrer or any commercial equivalent for large scale reactions. Injector mixers, in which one liquid is introduced turbulently into a flowing stream of a second liquid, either by forced feed or by Bernoulli pressure differential, are also satisfactory. Such mixers are also useful in two-phase low temperature polymerizations, such as described in copending application Serial No. 226,065, now U.S. Patent No. 2,831,834 of Magat. When the medium employed is a solvent for the polymer produced, milder stirring is frequently sufficient.

In general, the reactants are combined in the reaction medium in substantially equimolecular proportions. Enough reaction medium should be present so that the concentration of reactants is not greater than about 35%. A lower concentration of reactants, for instance, as low as 0.1% may be used. It is preferred that the polymerization occur within the range of concentration of about 1 to about 20% by weight. It has been observed that purity of reactants is conducive to the production of high molecular weight product. It is preferable that the solvent and reactants contain a minimum of impurities and that the water content of the medium be less than about 0.3 percent by weight. While the reaction is very rapid, in general, it is preferred to continue agitation for at least 2 to 3 minutes and sometimes as much as 30 minutes to assure completion. Longer reaction periods may be employed without deleterious results. Sometimes the product precipitates. However, as illustrated in the examples, the polymer may go into solution immediately in the reaction medium and in such cases, the polymer solution is suitable for further processing without isolation of the polymer.

Usually, the reaction is carried out at room temperature. Lower temperatures, as low as −50° C., may be employed to slow the reaction somewhat. Higher temperatures, as high as 100° C., are sometimes desirable. The process of the present invention produces a high quality product, generally having an inherent viscosity in sulfuric acid of above 1.0, in excellent yields. Yields near 100% are not uncommon.

This application is a continuation-in-part of application Serial No. 642,926, filed February 28, 1957, now abandoned.

The claimed invention:

1. A process for the preparation of a polyamide, at least 90% of the repeating units of which are wholly aromatic, the said polyamide having a melting point of at least about 300° C. and an inherent viscosity in concentrated sulfuric acid of at least about 0.6, which comprises (1) contacting, with sufficient agitation to produce visible turbulence at a temperature below about 100° C. and in the presence of a solvent for the materials contacted, substantially equimolecular amounts of (a) an aromatic diamine, the amine groups of which are attached to non-adjacent carbocyclic carbon atoms of the said diamine and (b) an aromatic diacid halide, the acid halide groups of which are attached to nonadjacent carbocyclic carbon atoms of the said diacid halide, the said solvent having an average solute-solvent interaction energy with complementary model compounds representative of the said polymer of less than about 1100 calories per mole and being a member of the class consisting of (I) a halogenated non-aromatic hydrocarbon containing at least one hydrogen on carbon attached to halogen, (II) a cyclic methylene sulfone, (III) a compound of the formula

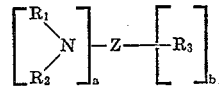

wherein $R_1$, $R_2$ and $R_3$ are members of the class consisting of lower alkyl and alkylene radicals and the total number of carbon atoms in $R_1$, $R_2$ and $R_3$ is less than 7, "a" is a whole number greater than zero and less than 3, "b" is a whole number of from zero to one inclusive and Z is a member of the class consisting of

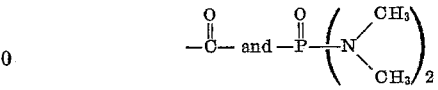

the sum of "a" and "b" in the formula being such as to satisfy the valence of Z, (IV) acetonitrile and (V) dimethyl cyanamide and (2) contacting the reaction mass with acid acceptor to react with substantially all acid formed in the reaction.

2. The process of claim 1 in which the acid acceptor is an organic tertiary amine.

3. The process of claim 2 in which the tertiary amine is triethylamine.

4. The process of claim 1 wherein the aromatic diamine is meta-phenylene diamine.

5. The process of claim 4 in which the diacid halide is isophthaloyl chloride.

6. The process of claim 5 in which the liquid reaction medium is a liquid selected from the class consisting of chloroform, methylene chloride, 1,1,2-trichloroethane, 1,2-dichloroethane, methyl ethyl ketone, acetonitrile, tetramethylene sulfone, 2,4-dimethyltetramethylene sulfone, diethylcyanamide, dimethylcyanamide, chlorobromomethane, symtetrachloroethane, cis-1,2-dichloroethane and propionitrile.

7. The process of claim 5 in which the liquid reaction medium is dimethylacetamide, 8. The process of claim 5 in which the liquid reaction medium is N-methyl pyrrolidone.

References Cited in the file of this patent

UNITED STATES PATENTS

| | | |
|---|---|---|
| 2,130,523 | Carothers | Sept. 20, 1938 |
| 2,130,948 | Carothers | Sept. 20, 1938 |
| 2,244,192 | Flory | June 3, 1941 |
| 2,465,319 | Whinfield et al. | Mar. 22, 1949 |
| 2,708,617 | Magat et al. | May 17, 1955 |
| 2,741,607 | Bradley et al. | Apr. 10, 1956 |

FOREIGN PATENTS

| | | |
|---|---|---|
| 897,257 | France | Mar. 16, 1945 |